J. L. WOODBRIDGE.
TRANSMISSION GEARING.
APPLICATION FILED MAY 6, 1912.
1,125,243.
Patented Jan. 19, 1915.
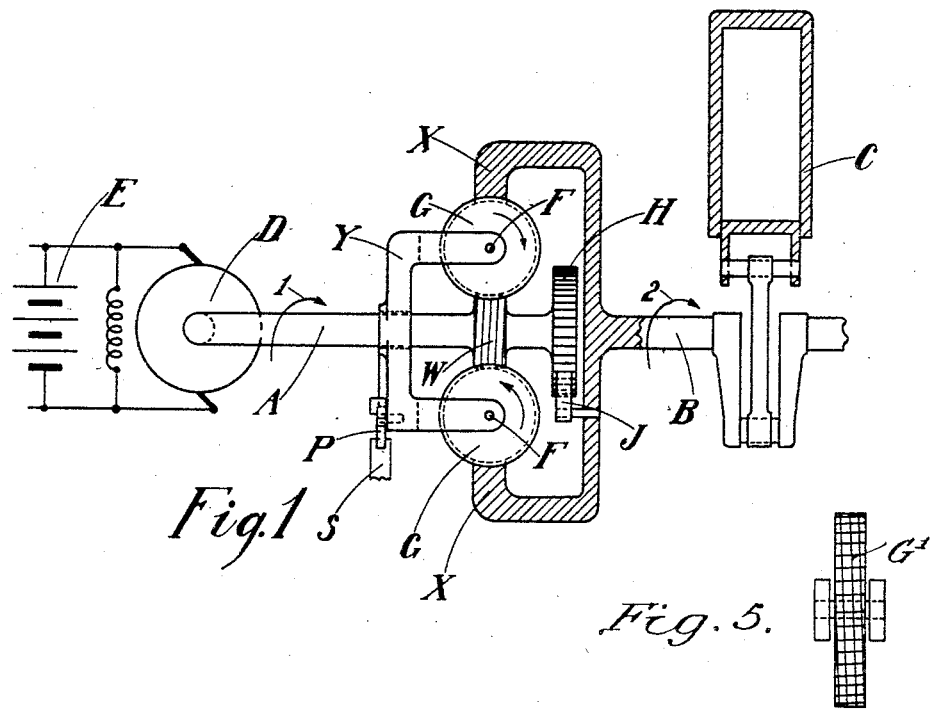
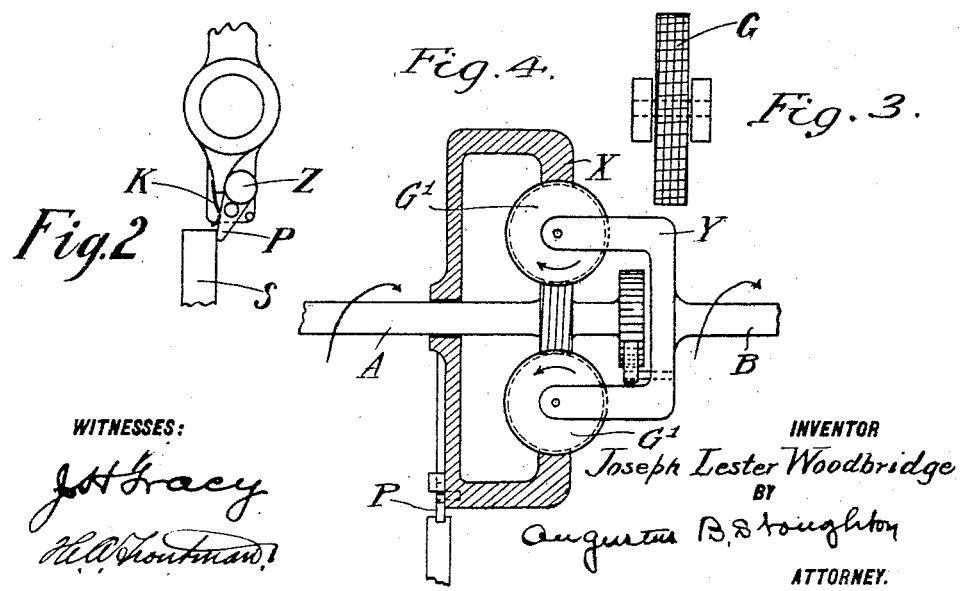
WITNESSES:
INVENTOR
Joseph Lester Woodbridge
BY
Augustus B. Stoughton
ATTORNEY.

UNITED STATES PATENT OFFICE.

JOSEPH LESTER WOODBRIDGE, OF PHILADELPHIA, PENNSYLVANIA.

TRANSMISSION-GEARING.

1,125,243.  Specification of Letters Patent.  Patented Jan. 19, 1915.

Application filed May 6, 1912. Serial No. 695,518.

*To all whom it may concern:*

Be it known that I, JOSEPH LESTER WOODBRIDGE, a citizen of the United States, and a resident of Philadelphia, State of Pennsylvania, have invented certain new and useful Improvements in Transmission-Gearing, of which the following is a specification.

My invention relates to apparatus in which power is to be transmitted between rotating shafts in either direction, and especially to apparatus in which two speed ratios are employed depending upon the direction of power transmission. In my application No. 616,424, filed March 23rd, 1911, I have described apparatus of this kind in which the two shafts were not co-axial. In the present invention I have applied the same principle to two shafts which are co-axial and have also embodied other improvements, which will appear from the following description taken in connection with the accompanying drawings, in which—

Figure 1 is a side view partly in section of apparatus embodying features of my invention. Fig. 2 is an end view to an enlarged scale of the pawl P of Fig. 1. Fig. 3 is an end view of one of the gear wheels G of Fig. 1. Fig. 4 is a modification of the apparatus shown in Fig. 1 in which the internal gear wheel X is freely supported on the shaft A while the gear wheels $G^1$ $G^1$ are mounted on the shaft B. Fig. 5 is an end view of one of the gear wheels $G^1$. In Fig. 1 the transmission apparatus is shown in connection with an automobile starting and lighting system, although its application is not confined to such a system.

In Fig. 1 A is a shaft mechanically connected to a dynamo-electric machine D, the latter being electrically connected to a storage battery E in any suitable manner.

B is a second shaft which as here shown is the shaft of a gasolene engine whose cylinder is shown at C.

The apparatus is so designed that for starting the engine from the battery a very considerable reduction of speed and increase of torque is produced in transmission of power from shaft A to shaft B, whereas when the power is transmitted in the opposite direction from B to A, a speed ratio of 1:1 is maintained. This change of speed ratio is effected automatically in response to the direction of power transmission, and is accomplished by reason of the construction of the apparatus described below.

The shaft A carries a worm W which engages with two planetary gear wheels G G revoluble about their axes F F at right angles to the axis of the shafts. As shown in Fig. 1 these gear wheels G G are carried on a yoke Y which is free to revolve about the shaft A. On the face of the gear wheels G G are two sets of grooves. One of these sets of grooves runs across the face and is arranged to engage with the threads of the worm W in the usual manner. The other set of grooves is nearly at right angles with the first and engages with the internally projecting teeth of the gear wheel X. These two sets of grooves are shown in Fig. 3 which is an end view of the gear wheel G to an enlarged scale, the grooves being represented by lines on the face of the gear wheel. The internal gear wheel X is mechanically connected to the shaft B.

Mounted on the yoke Y is a pawl P arranged to engage with the stop S. This pawl prevents the yoke Y from rotating in the direction opposite to that of the shafts A and B as indicated by arrows 1, 2, but permits this yoke to rotate in the direction of these arrows. The detail of this pawl and its mounting are shown more clearly in Fig. 2 which is an end view to a somewhat enlarged scale. The pawl P is provided with a weight Z at the end opposite to that which engages with the stop S and the design is such that above a certain speed the centrifugal force of this weight will overcome spring K and turn the pawl so that it will no longer strike the stop S.

On the end of shaft A is shown a ratchet wheel H which engages with a second pawl J mounted on the face of the gear wheel X. This pawl is so arranged that when the shaft B is driving and the shaft A is being driven, the power is transmitted through the pawl to the ratchet wheel H and both shafts rotate at the same speed.

The operation of the apparatus is as follows: When the shaft B is at rest and current is transmitted from the battery E to the dynamo electric machine D, the latter operates as a motor to turn the shaft A in the direction of the arrow 1. So long as the shaft A is rotating faster than the shaft B, the pawl J does not engage with the ratchet wheel H. However, the worm W turns the gear wheel G in the direction of the arrow, and the effect of these gear wheels is to produce relative rotation between the internal gear wheel X and the yoke Y, the tendency being to rotate gear wheel X in the direction of the arrow 2 and the yoke Y in the opposite direction. The latter will revolve about the shaft until the pawl P strikes the stop S when no further motion of the yoke Y can take place and the gear wheel X will then drive the shaft B in the direction of the arrow 2 and start the engine. As soon as the engine is started, and its speed has increased sufficiently, the pawl J will engage with the ratchet H and the shaft B will then transmit power in the opposite direction to the shaft A driving the dynamo electric machine D at an increased speed as a generator for charging the battery E. The yoke Y will be driven at the same speed as the shaft A and the increase of speed will throw the pawl P out of engagement with the stop S, thus avoiding the wear which would occur if this pawl should strike the stop at every revolution.

In Fig. 4 a modification of the apparatus of Fig. 1 is shown in which the gear wheel X instead of being mechanically connected to the shaft B is free to rotate on the shaft A, while the yoke Y which carries the gear wheels G¹ is mechanically attached to the shaft B. The pawl P in this case is carried by the gear wheel X but its function is the same as described in connection with Fig. 1. The angle between the two sets of grooves on the face of the gear wheels G¹, as shown in Fig. 5, is different from that shown in Fig. 3. The angle between these grooves on the gear wheel G of Fig. 3 is necessarily somewhat less than a right angle, whereas the grooves shown in Fig. 5 may be exactly at right angles to each other.

Having described my invention what I claim and desire to secure by Letters Patent is:

1. In combination, two co-axial rotatable shafts A and B, a mounting fixed to the shaft B, a mounting free from said shafts, a worm fixed to shaft A, a train of gearing including an internally toothed gear co-axial with the shafts and a second gear eccentrically mounted with respect to the shafts on an axis at an angle with the shaft axis, whereof one of said gears is carried on the mounting fixed to shaft B and the other is carried on the mounting free from the shafts, said second gear being provided with two sets of grooves on its face whereof one engages with the worm and the other with the internal teeth of the first gear, and means to prevent the rotation of the free mounting in one direction.

2. In combination, two co-axial rotatable shafts A and B, a gear train adapted to transmit power from shaft A to shaft B at reduced rotational speed, said gear train mounted wholly on the shafts, and including a member rotatable with respect to the shafts, a pawl on said rotatable member, a stop independently mounted with respect to said shafts and gear train, and adapted to engage said pawl in one direction of rotation to cause transmission of power from shaft A to shaft B but to fail to engage in the opposite direction to prevent transmission of power from shaft B to shaft A, a counter weight for said pawl adapted by its centrifugal force to hold said pawl out of contact with the stop at speeds above a predetermined limit, and a clutch device between the two shafts adapted to engage to cause shaft B to drive shaft A directly but to disengage to prevent shaft A from driving shaft B directly.

3. In combination, two co-axial rotatable shafts, means for transmitting power between them including a worm on one of said shafts, a planetary gear and an internally toothed gear co-axial with the shafts, said planetary gear being revoluble on an axis substantially at right angles with that of the shafts and not in the same plane and said planetary gear being provided with two sets of grooves on its face whereof one set is adapted to engage with the worm, and the other with the teeth of the internally toothed gear.

In testimony whereof I have hereunto signed my name.

JOSEPH LESTER WOODBRIDGE

Witnesses:
J. H. TRACY,
F. G. BEETEM.